United States Patent
Huang et al.

(10) Patent No.: US 12,272,046 B2
(45) Date of Patent: Apr. 8, 2025

(54) FEATURE DETECTION BASED ON NEURAL NETWORKS

(71) Applicant: International Business Machines Corporation, Armonk, NY (US)

(72) Inventors: JingChang Huang, Shanghai (CN); Guo Qiang Hu, Shanghai (CN); Peng Ji, Nanjing (CN); Yuan Yuan Ding, Shanghai (CN); Sheng Nan Zhu, Shanghai (CN); Jinfeng Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 17/026,620

(22) Filed: Sep. 21, 2020

(65) Prior Publication Data

US 2022/0092756 A1    Mar. 24, 2022

(51) Int. Cl.
*G06N 3/08*        (2023.01)
*G06N 3/045*       (2023.01)
*G06T 3/40*        (2006.01)
*G06T 7/00*        (2017.01)
*G06V 20/40*       (2022.01)

(52) U.S. Cl.
CPC ............ *G06T 7/001* (2013.01); *G06N 3/045* (2023.01); *G06N 3/08* (2013.01); *G06T 3/40* (2013.01); *G06V 20/41* (2022.01)

(58) Field of Classification Search
CPC . G06N 3/045; G06N 3/08; G06T 3/40; G06T 2207/20081; G06T 2207/20084; G06V 10/82
See application file for complete search history.

(56) References Cited

U.S. PATENT DOCUMENTS

| 9,774,773 B2 | 9/2017 | Lin et al. | |
| 2010/0277650 A1* | 11/2010 | Matsuzaki | G11B 27/28 348/700 |
| 2012/0027286 A1 | 2/2012 | Xu et al. | |
| 2015/0262350 A1 | 9/2015 | Lin et al. | |

(Continued)

FOREIGN PATENT DOCUMENTS

WO    2015028978 A1    3/2015

OTHER PUBLICATIONS

Kang et al., "Object Detection from Video Tubelets with Convolutional Neural Networks", Apr. 14, 2016, 9 pages.

(Continued)

*Primary Examiner* — Phenuel S Salomon
(74) *Attorney, Agent, or Firm* — Yee & Associates, P.C.

(57) ABSTRACT

A plurality of different images of a same region of interest in an object are input into a set of neural networks, wherein each image of the region has been captured under a different value of a variable condition. A classification for each image is generated by the set of neural networks, wherein each classification includes a confidence score in a prediction of whether a feature is present in the region. The image classifications are ensembled to generate a final classification for the region. By applying a loss function, a loss is computed based on comparing the final classification to a ground truth of whether the feature is present in the region. The parameters of the set of neural networks are adjusted based on the computed loss.

20 Claims, 9 Drawing Sheets

(56) References Cited

U.S. PATENT DOCUMENTS

| | | | | |
|---|---|---|---|---|
| 2016/0292856 | A1* | 10/2016 | Niemeijer | G06T 7/0012 |
| 2016/0300104 | A1* | 10/2016 | Oka | G06F 3/01 |
| 2017/0124704 | A1* | 5/2017 | Wu | G06T 7/0012 |
| 2018/0354169 | A1* | 12/2018 | Shirakawa | G06T 7/0008 |
| 2019/0066493 | A1* | 2/2019 | Sohn | G06N 3/08 |
| 2019/0095701 | A1* | 3/2019 | Li | G06T 7/13 |
| 2019/0147283 | A1* | 5/2019 | Giering | G06V 10/82 |
| | | | | 382/103 |
| 2019/0289282 | A1* | 9/2019 | Briggs | H04N 23/71 |
| 2019/0325269 | A1* | 10/2019 | Bagherinezhad | G06F 18/241 |
| 2020/0012884 | A1* | 1/2020 | Zhao | G06F 18/213 |
| 2021/0133496 | A1* | 5/2021 | Barnehama | G06F 18/41 |
| 2021/0233229 | A1* | 7/2021 | Hyatt | G06T 7/0004 |
| 2021/0279893 | A1* | 9/2021 | Iwanowski | G06V 10/143 |
| 2022/0293268 | A1* | 9/2022 | Nishide | G16H 40/67 |

OTHER PUBLICATIONS

Zhu et al., "Flow-Guided Feature Aggregation for Video Object Detection", Aug. 18, 2017, 10 pages.

Lu et al., "Online Video Object Detection using Association LSTM", 2017 IEEE International Conference on Computer Vision (ICCV), Oct. 22-29, 2017, pp. 2344-2352.

Xiao et al., "Video Object Detection with an Aligned Spatial-Temporal Memory", Jul. 27, 2018, 17 pages.

Wang et al., "Fully Motion-Aware Network for Video Object Detection", Conference paper, First Online: Oct. 6, 2018, 16 pages.

* cited by examiner

FEATURE DETECTION BASED ON NEURAL NETWORKS

BACKGROUND

The present disclosure relates generally to the field of data processing, and, more particularly, to the detection of visual features of objects.

Neural networks, in particular convolutional neural networks (CNNs), are useful machine learning models for image analysis. Training a neural network involves using a loss function (also known as an objective function or cost function) to evaluate candidate sets of parameters (e.g., weights) of the model. During a training iteration, an output of the model is generated based on the model's input, and then a value of an error (referred to as a loss) is calculated by the loss function based on that output. This loss value is used to adjust a current candidate set of parameters of the model. Through multiple training iterations, the accuracy of the model increases as the loss values are minimized.

SUMMARY

Embodiments of the present disclosure include a method. As part of the method, a plurality of different images of a same region of interest in an object are input into a set of neural networks, wherein each image of the region has been captured under a different value of a variable condition. A classification for each image is generated by the set of neural networks, wherein each classification includes a confidence score in a prediction of whether the feature is present in the region. The image classifications are ensembled to generate a final classification for the region. By applying a loss function, a loss is computed based on comparing the final classification to a ground truth of whether the feature is present in the region. The parameters of the set of neural networks are adjusted based on the computed loss.

Embodiments of the present disclosure further include a computer program product. The computer program product comprises at least one computer readable storage medium. The at least one computer readable storage medium has program instructions embodied therewith that are configured, when executed by at least one computer, to cause the at least one computer to perform a method. As part of the method, a plurality of different images of a same region of interest in an object are input into a set of neural networks, wherein each image of the region has been captured under a different value of a variable condition. A classification for each image is generated by the set of neural networks, wherein each classification includes a confidence score in a prediction of whether the feature is present in the region. The image classifications are ensembled to generate a final classification for the region. By applying a loss function, a loss is computed based on comparing the final classification to a ground truth of whether the feature is present in the region. The parameters of the set of neural networks are adjusted based on the computed loss.

Embodiments of the present disclosure further include a system. The system includes at least one computer readable storage medium and at least one processor in communication with the at least one computer readable storage medium. The at least one processor is configured to obtain instructions from the at least one computer readable storage medium that cause the at least one processor to perform a method. As part of the method, a plurality of different images of a same region of interest in an object are input into a set of neural networks, wherein each image of the region has been captured under a different value of a variable condition. A classification for each image is generated by the set of neural networks, wherein each classification includes a confidence score in a prediction of whether the feature is present in the region. The image classifications are ensembled to generate a final classification for the region. By applying a loss function, a loss is computed based on comparing the final classification to a ground truth of whether the feature is present in the region. The parameters of the set of neural networks are adjusted based on the computed loss.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1A:
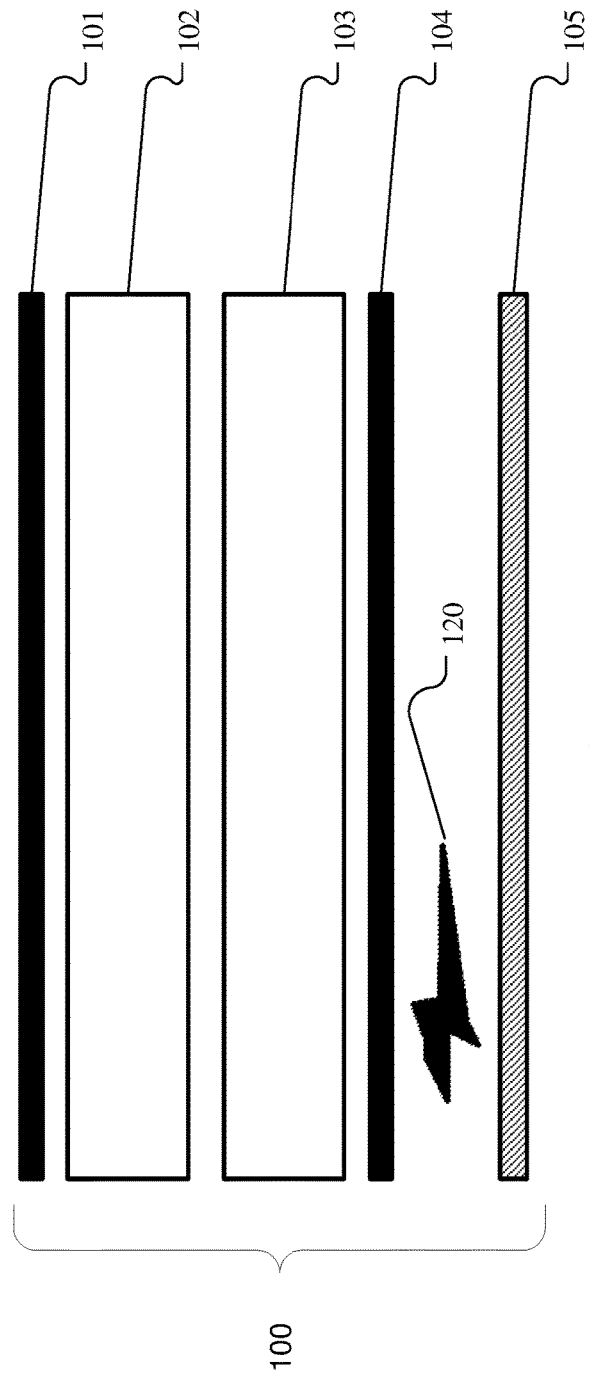
FIG. 1A illustrates a cross-sectional side view of a liquid-crystal display (LCD) panel 100 having a defect (mura) 120.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to the detection of visual features of objects. While the present disclosure is not necessarily limited to such applications, various aspects of the disclosure may be appreciated through a discussion of various examples using this context.

Some embodiments of the present disclosure recognize that, in the field of image analysis, the detectability of visual features present in objects may vary significantly depending on the conditions under which the images of the objects are captured. Even relatively small changes in the values of a particular condition surrounding the image capture may have large impacts on whether a feature is visible in that image of an object. This can lead to significant errors or search costs associated with detecting whether a feature is present in an object due to a high rate of false negatives (i.e., instances where the feature is present in the object but not detectable in a relevant image thereof). For example, a crest stamped with invisible or color-shifting ink (feature) on the back of a banknote (object) may only be visible in an image that was captured under lighting within a narrow range of the electromagnetic spectrum (variable condition). For another example, a particular star (feature) in the sky (object) may only be detectable when photographed at a time when the ambient lighting (variable condition) is not excessive.

Another example of a feature that is difficult to detect is a physical defect (mura) in a liquid-crystal display (LCD) panel. Referring now to the figures, shown in FIG. 1 is a block diagram depicting an example of a cross-sectional side view of an LCD panel 100 having a defect 120. As shown, the LCD panel 100 has two layers of glass 102, 103 disposed between a top polarizer 101 and bottom polarizer 104. The bottom layer of the panel 100 includes backlighting array 105. Also depicted in the panel is the defect 120. In some situations, the difficulty of detecting a mura in an LCD panel may be complicated by the fact that the location of the mura relative to one or more polarizers or other panel layers may mean that the mura is only visible from a relatively small and specific set of viewing angles. Given this limited range of visibility, automatic LCD panel quality inspection may require that a series of images (all covering the same inspection region) of a single panel need to be captured from different viewing angles. Inspections of fewer images (and correspondingly fewer viewing angles) risks missing the correct angle to detect a defect. As a result, properly training a neural network to perform this inspection task may require a huge set of training data that includes more than one-million different labeled training images gained by capturing images of more than one-thousand different panels taken at more than a thousand different camera angles each.

Figure 1B:
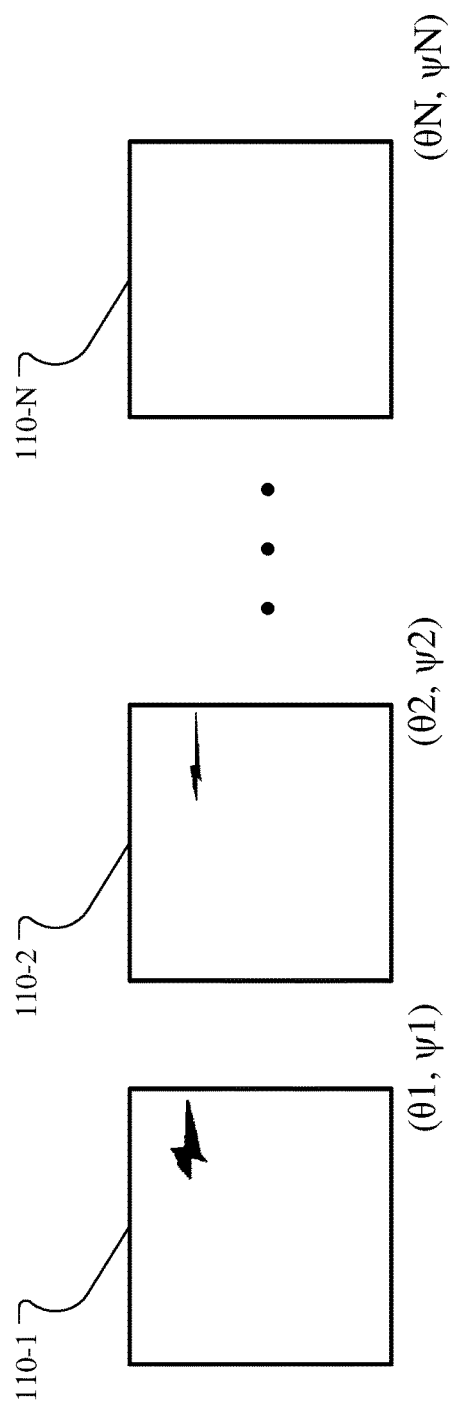
FIG. 1B illustrate a series of top-view images 110-1 to 110-N of the LCD panel 100 captured from a variety of different viewing angles, in accordance with embodiments of the present disclosure.

This problem of a feature being detectable from only a limited set of viewing angles is perhaps best explained with reference to FIG. 1B, which depicts a series of overhead images 110-1 to 110-N of the LCD panel 100 captured from a variety of different viewing angles (e.g., camera angles) above the panel's top surface. In some embodiments, such images with different viewing angles may be captured using a video camera situated on a movable support and/or rotating platform such that the camera has at least two degrees of freedom relative to the object of interest and each image corresponds to a different frame in the video. The viewing angle may be measured in terms of spherical coordinates, with each viewing angle including as its components a polar angle $\theta$ and an azimuthal angle $\psi$. For example, as shown in FIG. 1B, the defect 120 is most visible in image 110-1, captured from viewing angle ($\theta 1$, $\psi 1$); less visible in image 110-2, captured from viewing angle ($\theta 2$, $\psi 2$); and completely undetectable from viewing angle ($\theta N$, $\psi N$). In this particular example, the distance from the camera to the panel center remains fixed as the viewing angle changes.

Embodiments of the disclosure further recognize that having a limited range of values of a condition under which a feature is visible may also create significant hurdles in the training of a model to perform feature detection and/or labeling. For a simplistic example of how the problem could be framed, one could assume that there is a first object having the feature (feature present) and a second object not having the feature (feature absent). If there are ten training images of each object, and the conditions of image capture are varied such that the feature is only visible in five of the ten training images of the first object, how should the ten training images of the first object be labeled (in terms of feature present v. feature absent)? One possible solution would be to label all ten of the training images of the first object as depicting an object with the feature present. However, this would lead to many misleading image labels (e.g., those where the feature is not observable despite being present in the object of interest) and, ultimately, poor model training performance.

Embodiments further recognize that model training in this context may be made even more difficult in situations where the degree of detectability of a feature, when present, varies across a spectrum as the conditions of image capture change. This includes situations where the determination is something more than a binary set of detectable v. non-detectable. Under such circumstances, it may be very difficult to train a model to detect a present feature in images captured under less than ideal conditions. For example, in image 110-1 of FIG. 1B the defect 120 is very visible, whereas in image 110-2 that defect 120 is less visible. As such, it may be difficult to train a model to detect not only the very visible form of the defect in image 110-1, but also the less visible form of the defect in image 110-2.

Some embodiments of the present disclosure may address these concerns or others by linking/grouping/sequencing different images of a same region of an object together in a set when training neural networks in feature detection. This linking may take the form of inputting all of the images of the same region into a neural network to be trained to generate a separate classification for each image, with each image classification including a confidence score that is a measure of confidence in the presence or absence of the feature in the corresponding image. Next, these individual image classifications are ensembled to generate a final classification for the region. In some embodiments, this final classification may include an overall confidence score in the presence or absence of the feature in the corresponding region of the object. A loss function is then used to compare the final classification to a ground truth of whether the feature is present in the region to compute a loss. The parameters of the neural network are then adjusted (e.g., updated) based on the loss. In some embodiments, the process may then be iteratively repeated, using new images of new regions of new objects, until the neural network is sufficiently trained.

In some embodiments, this ensembling of confidence scores may significantly improve the training of a model as compared to situations where the confidence scores for different images of the same region on the same object are not linked. In particular, neural networks trained using this technique may be better able to detect less visible forms of the feature found in images captured under less than ideal conditions. This may lead to a more robust and useful model, both in situations where the trained neural network is used to detect features in real world use cases and in situations where the trained neural network is used to detect and label features in sets of training images to be used together in labeled sets to train other neural networks. Furthermore, in some embodiments, neural networks configured for use in labeling training images may themselves be trained on relatively few images by applying techniques described herein, such that training speed and efficiency may be further increased in the context of generating labeled training images.

Figure 2:
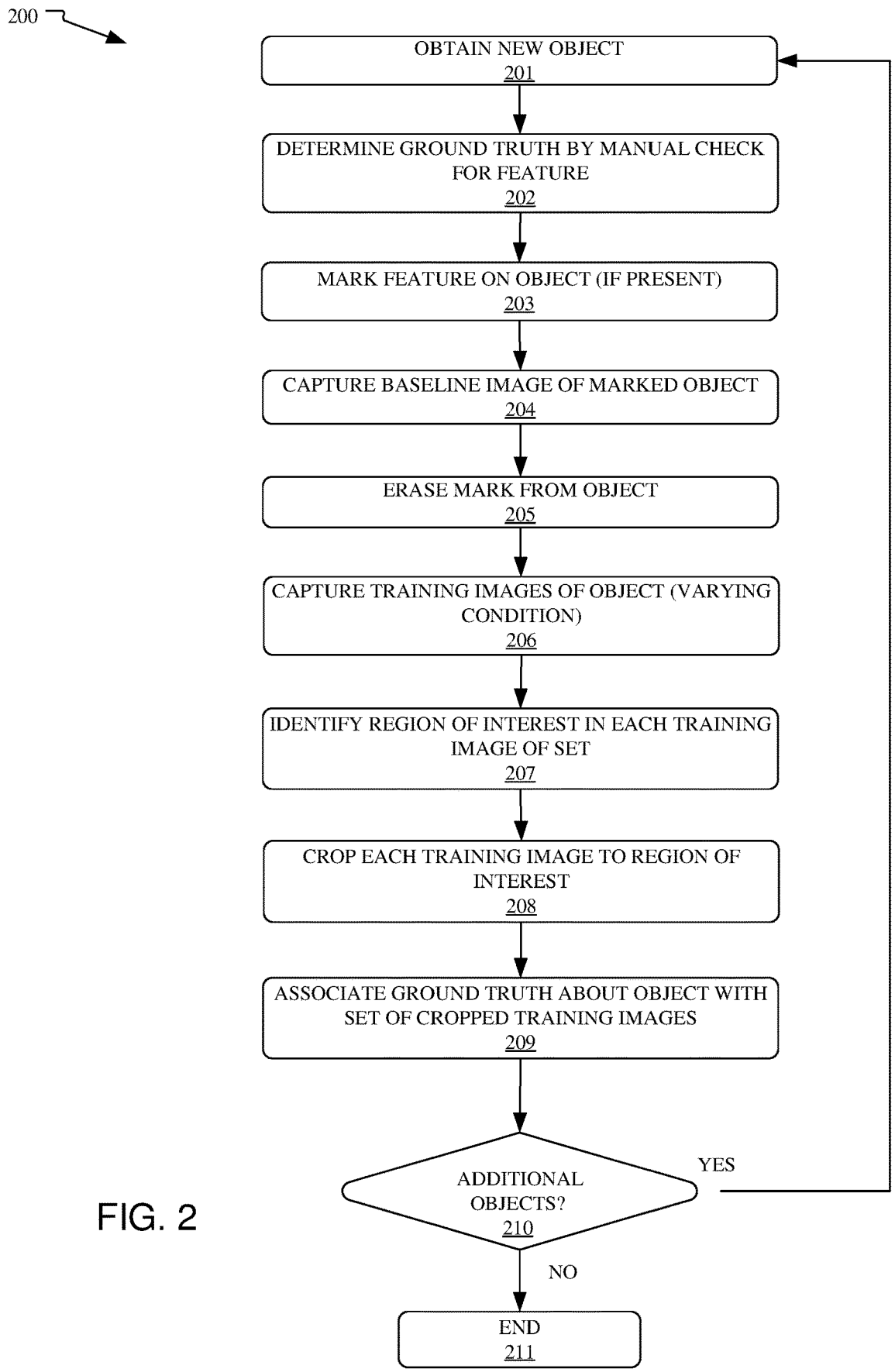
FIG. 2 illustrates a flow diagram of a method 200 for generating a set of cropped images of a region of interest of an object, wherein the images of the object are captured under varying values of a variable condition, in accordance with embodiments of the present disclosure.

Referring now to FIG. 2, shown is a flow diagram of a method 200 for generating a set of cropped images of a region of interest of an object, wherein the images of the object are captured under varying values of a variable condition, in accordance with embodiments. In some embodiments, operations of the method 200 may be performed on a processor of a computer (e.g., computer system 801 of FIG. 8). The method 200 begins at operation 201, wherein a new object to be examined is obtained. This object may be any type of object of interest, including, for example, a workpiece to be checked for a defect. This object may be chosen from among a ground of objects to be analyzed, wherein the objects are of the same type and/or differ only to the extent of whether/where the feature of interest is in present in them. Per operation 202, a ground truth about the presence or absence of a feature of interest in the object is determined based on a manual inspection of the object for the presence of the feature. Per operation 203, if the feature is present, it is physically marked on the object (e.g., with an erasable marker). Per operation 204, a baseline image of the (marked) object is captured. This captured image may be in the form of a video or photograph. Per operation 205, the mark is then erased from the object. In some embodiments, as discussed below, the baseline image may be useful as a comparison basis from which to determine the location of the feature in other images of the object.

Next, per operation 206, training images of the object are captured (e.g., as to be extracted frames from video footage). As these images are captured, the value of the condition of interest is varied, such that the visibility of the feature (if present) correspondingly varies among the images. Per operation 207, a region of interest of the object is decided upon and the region is identified (e.g., located) in each training image of the set. In some situations, the region of interest may be selected based it encompassing the location of the feature in the object. In other situations, the region of interest may be chosen at random or chosen specifically because it does not include the feature. The later may be particularly useful in situations where an experimental control is desirable. In some embodiments, the identification of the region within a given image may need to be calculated by applying a space coordinate transform to the predetermined location of the marked feature in the captured baseline image. This may be particularly true in embodiments where the images are captured from different locations or otherwise under different conditions (e.g., with different levels of camera zoom or from different viewing angles).

Next, per operation 208, each of the training images are cropped to the region of interest (e.g., the region of interest is extracted from the remainder of the image). This may be useful, for example, when the whole object is captured in each training image and the region comprises only a small portion of each object. By cropping out the irrelevant portions of each image, the cropped images may become more useful for rapid/precise training. In some embodiments, once operation 208 is completed, the user may have a complete set of cropped images of a given object. These cropped images may be stored together and, per operation 209, may be associated, as a whole set, with the determined ground truth (per operation 202) about the presence or absence of the feature of interest in the region of interest on the object.

Next, per operation 210, a determination is made as to whether there other, additional objects of interest. For example, in the context of inspected workpieces, the additional object might be the next workpiece off of an assembly line. If, per operation 210, a determination is made that there are additional objects, then the method loops back to operation 201, and operations 202-209 are repeated on the next object. If, however, there are no additional objects, then, per operation 211, the method ends. In some embodiments, once the method 200 is completed, the user may have multiple whole sets of cropped training images of different objects, with each training set being associated with the ground truth for a corresponding particular object.

While example embodiments of method 200 are described with reference to FIG. 2, many variants and extensions on these examples are contemplated. For example, in some embodiments, operations 203-205 may be skipped entirely, as there may be no need to capture a marked baseline image of the object. This may be particularly true in situations where the relative location of the feature does not change in each image of the object, even as the detectability of the feature varies (e.g., due to changing lighting location or intensity). In such situations, the region of interest may be identifiable in each image without the need to reference the baseline image. For another example, in some embodiments, operations 207 and/or 208 may be skipped when there is no desire to crop the image down to the region or where the region of interest already encompasses all or substantially all of the image. In such situations, the subsequent training, labeling, or inspecting of images, as described herein, may be completed without the need to crop specific regions, as entire, complete images (e.g., of objects as a whole) are used instead for these operations.

Figure 3A:
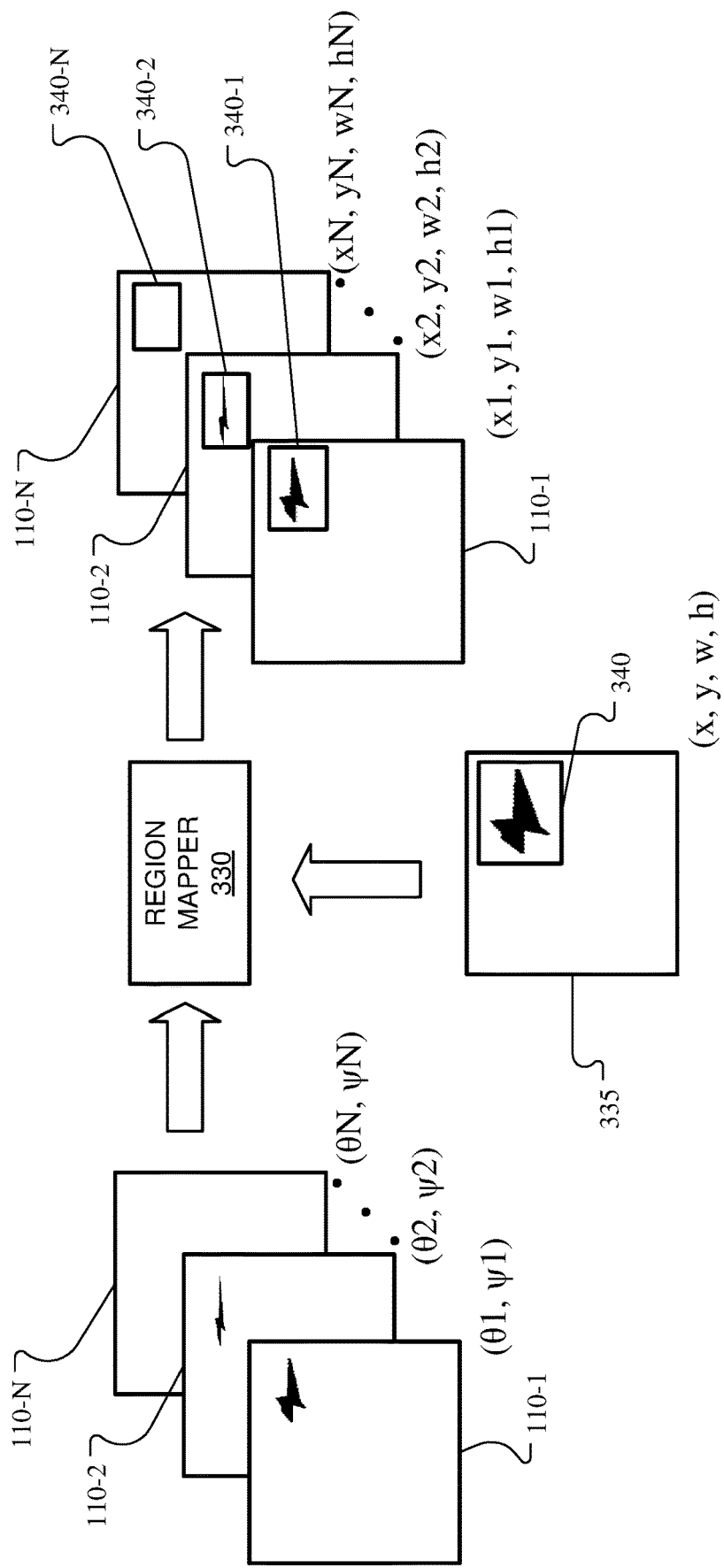
FIG. 3A illustrates a block diagram depicting a same region of interest 340 being mapped onto each image in the series of images 110-1 to 110-N of the LCD panel 100, in accordance with embodiments of the present disclosure.

Referring now to FIG. 3A, shown is a block diagram depicting a same region of interest 340 being mapped onto each image in the series of images 110-1 to 110-N of the LCD panel 100, in accordance with embodiments. In some embodiments, actions described with respect to FIGS. 3A and 3B may correspond to one or more operations of method 200 of FIG. 2. As shown, the region mapper 330 relies on a baseline image 335 of the LCD panel 100 that has the region of interest 340 surrounding the physical defect 120 clearly marked (e.g., using operations 203 and 204 of method 200). In some embodiments, the region of interest is defined by a bounding box around the defect 120 in the baseline image 335. As shown, the bounding box may be measured in terms of cartesian coordinates x and y of the center of the box along with a width w and height h of the box.

The region mapper 330 (e.g., per operation 207 of method 200) uses a space coordinate transformation to apply the associated viewing angles ($\theta 1$, $\psi 1$) through ($\theta N$, $\psi N$), for each image 110-1 through 110-N, to the bounding box (x, y, w, h) in the baseline image 335. This is done in order to identify the region of the interest 340-1 to 340-N in each of the images, as well as the dimensions of the bounding box (x1, y1, w1, h1) through (xN, yN, wN, hN) for each image. In some embodiments, each of 340-1 to 340-N may be considered an apparent location of the region interest 340 within corresponding images, and the differences between these apparent locations may be based on changes in viewing angle among the images.

Figure 3B:
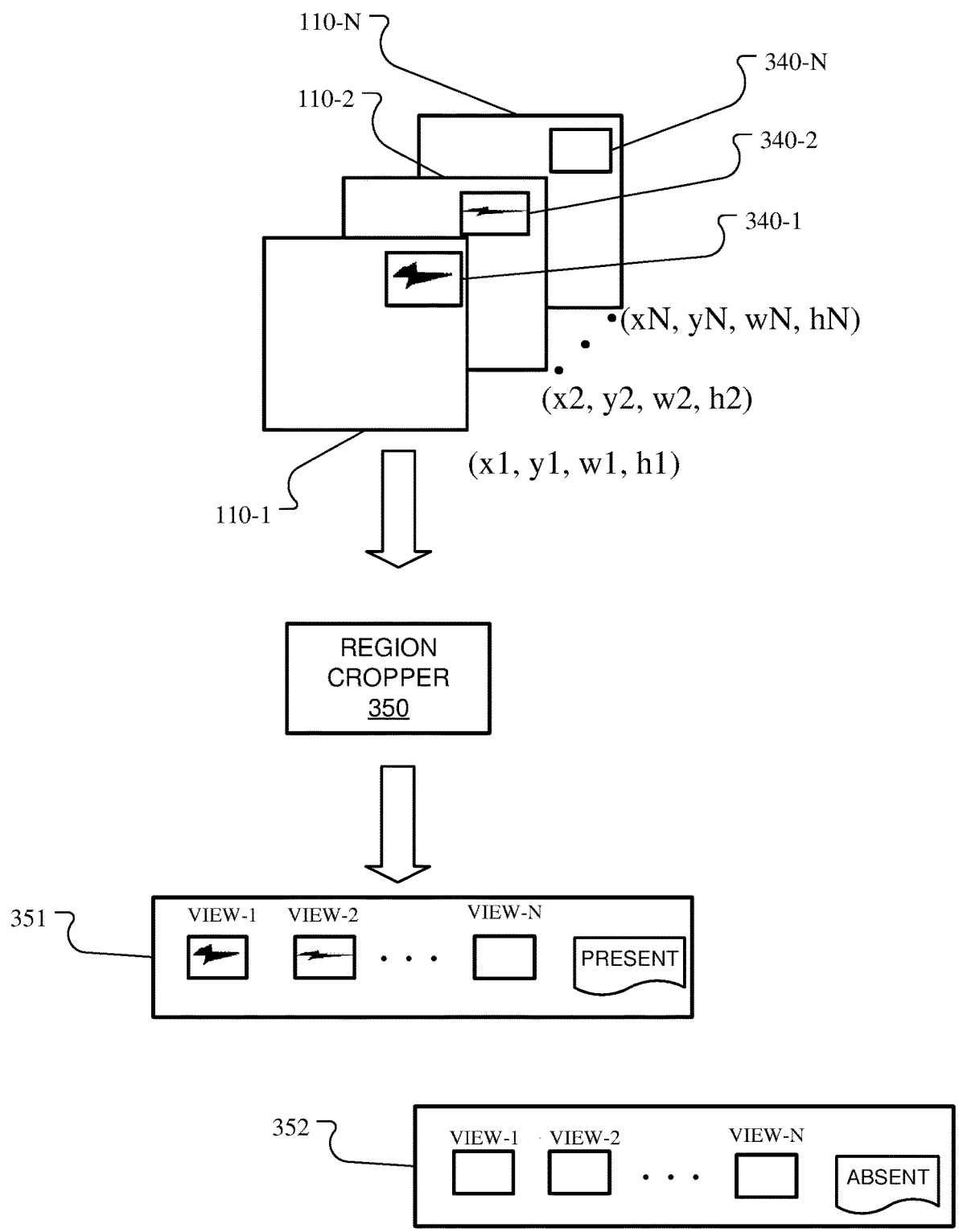
FIG. 3B illustrates a block diagram depicting the region of interest 340 being cropped from each of the images 110-1 to 110-N of the LCD panel 100 by a region cropper 350 in order to generate a set of cropped images 351 of the region, in accordance with embodiments of the present disclosure.

Continuing the example shown in FIG. 3A, FIG. 3B shows the region of interest 340 being cropped (e.g., per operation 208 of method 200) from each of the images 110-1 to 110-N of the LCD panel 100 by a region cropper 350 in order to generate a set of cropped images 351 of the region, in accordance with embodiments. As depicted, this set of cropped images 351 includes the cropped images as view-1 to view-N corresponding to region 340-1 to 340-N. The set of images is also associated (e.g., per operation 209 of method 200) with the ground truth that the defect is present in the region 340 of the panel 100.

In some embodiments, the set of cropped images 351 may be most useful for training when used together with a number (e.g., ten, fifty, five hundred, thousand) of other sets of cropped images, wherein each set is comprised of images from a different region of the same panel and/or different panels as the other sets. Some of these sets may be images of regions that do not include defects for the purpose of experimental control and/or avoiding overfitting of the model to be trained. For example, cropped image set 352 may be generated (e.g., per another iteration of operations 201-209 of method 200) by capturing images of a region, either in the same panel 100 or a different panel, that does not include a defect and is accordingly associated with a ground truth that a defect is absent from that region.

Figure 4:
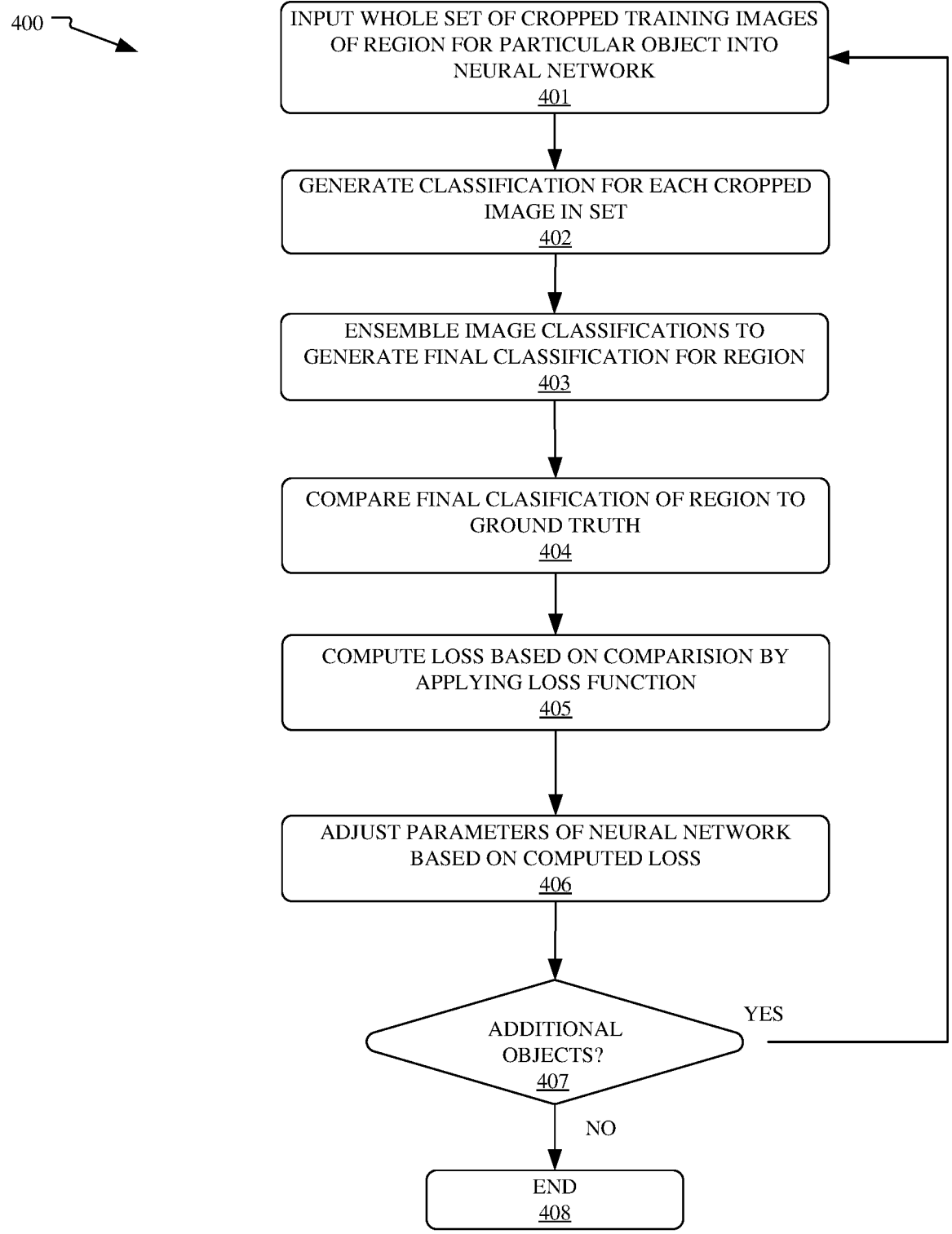
FIG. 4 illustrates a flow diagram of a method 400 for training an image labeler neural network to detect whether a feature is present in objects, in accordance with embodiments of the present disclosure.

Referring now to FIG. 4, shown is a flow diagram of a method 400 for training an image labeler neural network to detect whether a feature is present in objects, in accordance with embodiments. Once trained in accordance with the method 400, the image labeler neural network may be useful for detecting and labeling features in training images so that the training images can then be used in the training of other neural networks. In some embodiments, operations of the method 400 may be performed on a processor of a computer (e.g., computer system 801 of FIG. 8) or, more specifically, may be performed on/by a neural network being executed by the processor. The method 400 begins at operation 401, wherein a whole set of cropped training images of a region for a particular object (e.g., cropped image set 351 of FIG. 3) is input into a neural network (e.g., a CNN). In some embodiments, each image in the set may be input serially into the neural network. Further, in some embodiments, the neural network may actually be made up of a set of connected neural networks. In such embodiments, the number of networks in the set may be the same as the number of cropped training images in the whole set of cropped training images of the region. Per operation 402, a classification is generated for each cropped image in the set. Each such image classification includes a confidence score in a prediction, based on the neural network's analysis of the corresponding cropped image, of whether the feature of interest is present in the region of the object. This confidence score may take on either of two reciprocal forms, specifically, a confidence in the presence of the feature or a confidence in the absence of the feature. In some embodiments, each neural network of the set of neural networks may generate a single image classification corresponding the particular cropped training image that was input into that particular neural network.

Next, per operation 403, the image classifications are ensembled (e.g., combined or otherwise analyzed as a grouped set) to generate a final classification for the region of the particular object. In some embodiments, the final classification may include an overall prediction, based on all of the image classifications, of whether the feature is present in the region. The final classification may also include a confidence score in that overall prediction. The manner of the ensembling of the image classifications may take on a variety of forms dependent on the embodiment. For example, the ensembling may be a comparison of image classifications to each other and a selection of the image classification with the highest confidence score. In other embodiments, the image confidence scores may be averaged.

In yet other embodiments, more complicated combinations of the confidence scores may be used, such as selecting an image classification at random among the image classifications that exceed a particular confidence score threshold (e.g., 80% confidence) as representative of the final classification of the feature's presence or absence. These versions of ensembling that are more than a basic output of the highest score may be particularly useful in pushing the model toward the detection of features in images captured under less than optimal values of the variable condition.

Next, per operation 404, the final classification for the region is compared to the ground truth of whether the feature is present in the region. Based on that comparison, per operation 405, a loss is computed by applying a loss function. Per operation 406, the parameters of the neural network (or, in some embodiments, the parameters of each neural network within the connected set of neural networks) are adjusted based on the computed loss. Per operation 407, a determination is made as to whether there are additional sets of training images associated with other objects (or different regions of the same object). If so, then the method loops back to operation 401 and the operations 401-406 are repeated for an additional training set. Once the training iterations are completed the method ends, per operation 408. In some embodiments, the output of the method may be a trained image labeler neural network that is stored or transmitted for later use.

While example embodiments of method 400 are described with reference to FIG. 4, many variants and extensions on these examples are contemplated. For example, in some embodiments, rather than being used to train an image labeler neural network, the method may be useful for directly training a neural network to detect whether a feature is present in objects under inspection in non-training scenarios (e.g., training the neural network to detect defects in workpieces as they are being assembled as part of quality control).

Figure 5:
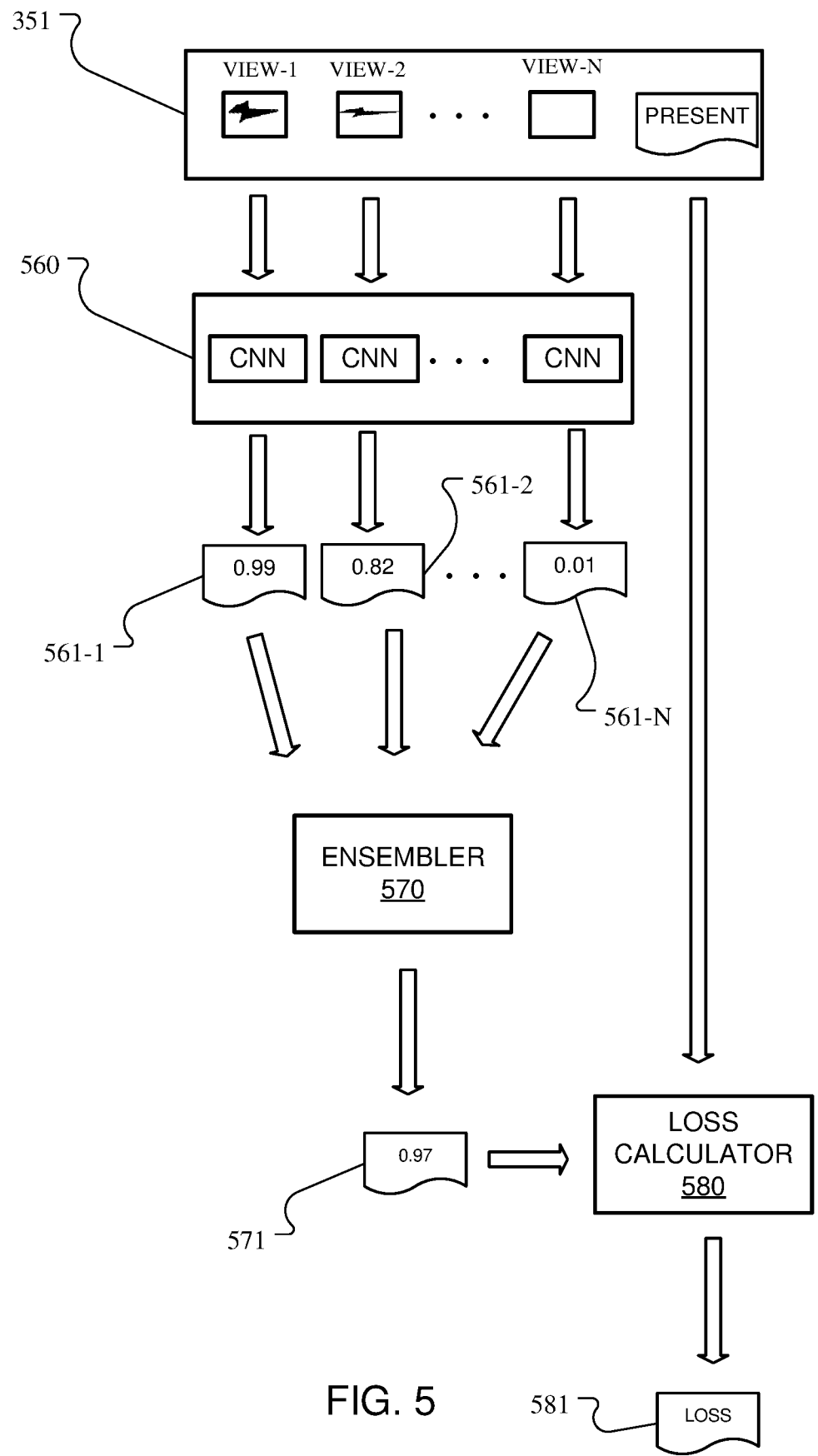
FIG. 5 illustrates a block diagram depicting the set of cropped images 351 being used to train a neural network 560, in accordance with embodiments of the present disclosure.

Referring now to FIG. 5, shown is a block diagram depicting the set of cropped images 351 being used to train a neural network 560, in accordance with embodiments. In some embodiments, actions described with respect to FIG. 5 may correspond to one or more operations of method 400 of FIG. 4. As shown, the individual cropped images of view-1 through view-N of the cropped image set 351 for the LCD panel 100 of FIG. 1 are input into a shared binary classifier neural network 560. In some embodiments, the neural network 560 may be an image labeler neural network to be trained. In the depicted example, the neural network 560 is made up of a set of connected CNNs. Additionally, while they are depicted as separate from neural network 560 for convenience, it is contemplated that ensembler 570 and loss calculator 580 may also be connected components within the neural network 560.

Based on the inputs of view-1 through view-N, the neural network 560 outputs (e.g., per operation 402 of method 400) corresponding image classifications 561-1 through 561-N for each view. In this example, because the defect 120 in the LCD panel 100 is most visible in view-1, image classification 561-1 includes a high confidence score in the presence of the defect (0.99) in that view. A lesser confidence score in image classification 561-2 is calculated for view-2 (0.82), and a very low confidence score in image classification 561-N is calculated for view-N (0.01). In the alternative, these confidence scores could be representative of confidence in the absence of the defect, in which case the relative levels of confidence included in the image classifications would be inversed.

Once the image classifications 561-1 through 561-N are obtained, they are input into the ensembler 570. As shown, the ensembler 570 outputs (e.g., per operation 403 of method 400) a final classification 571 for the particular region associated with cropped image set 351. In this example, the final classification 571 represents a relatively high confidence (0.97) in the presence of the defect in the LCD panel 100. The final classification 571 is then compared to the ground truth by the loss calculator 580 which applies the desired loss function to calculate the loss 581 (e.g., per operations 404 and 405 of method 400). The loss 581 may then be used to adjust the parameters of the neural network 560 (e.g., per operation 406 of method 400). The actions described with respect to FIG. 5 may then be iteratively repeated with additional sets of cropped images (e.g., cropped image set 352 of FIG. 3) until the network 560 is sufficiently trained.

Figure 6:
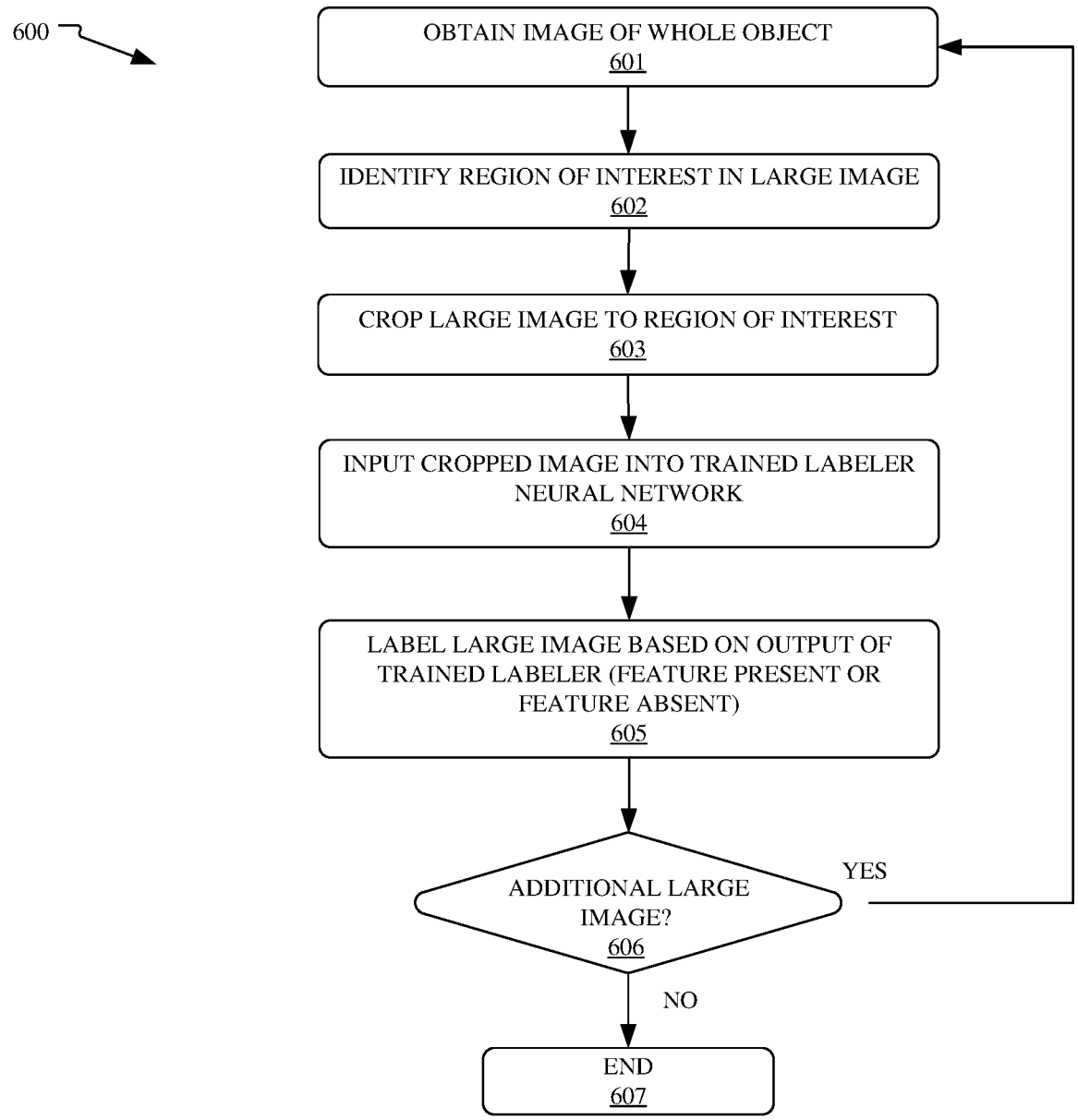
FIG. 6 illustrates a flow diagram of a method 600 of using a trained image labeler neural network to generate a set of labeled training images, in accordance with embodiments of the present disclosure.

Referring now to FIG. 6, shown is a flow diagram of a method 600 of using a trained image labeler neural network to generate a set of labeled training images, in accordance with embodiments. In some embodiments, operations of the method 600 may be performed on a processor of a computer (e.g., computer system 801 of FIG. 8) or, more specifically, may be performed on/by a neural network being executed by the processor. The method 600 begins at operation 601, wherein an image of a particular object as a whole is obtained. Within this large image of the object as a whole, a location of a region of interest is identified, per operation 602, and, per operation 603, the large image is cropped to the region of interest. Next, the cropped image is input, per operation 604, into the trained image labeler neural network for a determination of whether a feature of interest is detected within the region in the image. Based on the output from the neural network's analysis, and per operation 605, the large image is labeled with an indication of whether the feature is present in the image. In some embodiments, the location and/or size of the feature are also labeled on the image.

Next, per operation 606, a determination is made as to whether there are additional large images to be labeled. These images may be either of the same object captured under different conditions (e.g., changed camera angle or changed position of light source) or of a different object (of the same type). If it is determined, per operation 606, that additional images are to be labeled, then the method loops back to repeat operation 601-605. Once all of the desired training images are labeled, the method ends, per operation 607. In some embodiments, the end result of method 600 may be a large group of labeled training images (e.g., one thousand, ten thousand, one million), which may be stored or transmitted, and which are configured for use together in the training of other neural networks to detect whether the feature is present in other objects (e.g., during real-time inspection).

Figure 7:
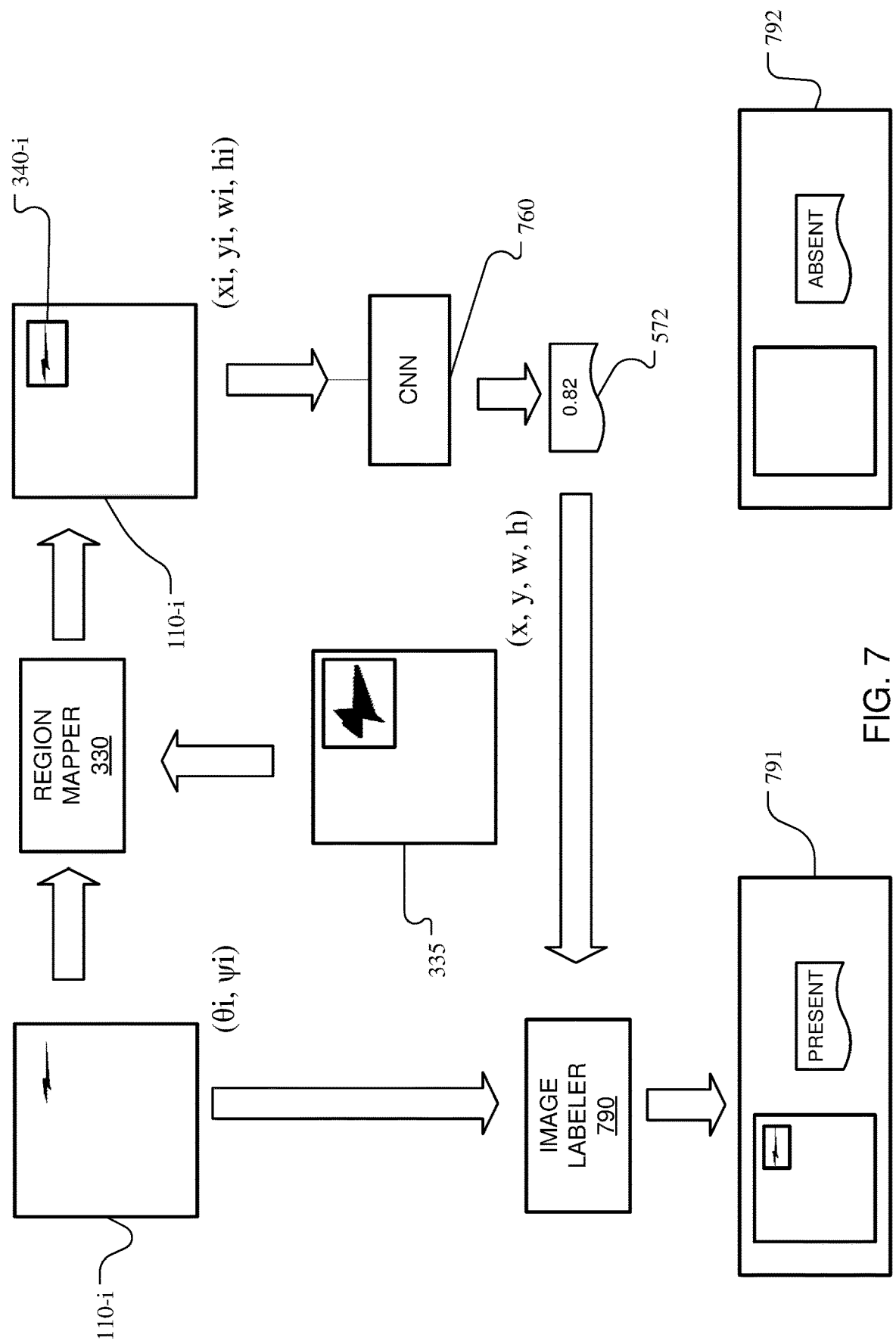
FIG. 7 illustrates a block diagram depicting an image 110-$i$ of the LCD panel 100 being analyzed by the trained neural network 760 and being labeled as including the defect 120 by an image labeler 790, in accordance with embodiments of the present disclosure.

Referring now to FIG. 7, shown is a block diagram depicting an image 110-$i$ of the LCD panel 100 being analyzed by the trained neural network 760 and being labeled as including the defect 120 by an image labeler 790, in accordance with embodiments. In some embodiments, actions described with respect to FIG. 7 may correspond to one or more operations of method 600 of FIG. 6. Additionally, while they are depicted as separate from neural network 760 for convenience, it is contemplated that region mapper 330 and image labeler 790 may also be connected components within the neural network 760.

As shown, the image 110-$i$ is an arbitrary training image, captured at camera angle ($\theta_i$, $\psi_i$) and selected from the group of images 110-1 to 110-2 of the LCD panel 100. The image 110-$i$ is input into the region mapper 330, wherein the angle ($\theta_i$, $\psi_i$) and the location of the region of interest in the baseline image 335 are used to identify the location of the region 340-$i$ in the image 110-$i$ as represented by ($x_i$, $y_i$, $w_i$, $h_i$). The image 110-$i$ is then cropped to the region 340-$i$ (cropping not shown), and the cropped image is input into the trained image labeler neural network 760.

In some embodiments, the neural network 760 may the same as or substantially similar to neural network 560 (once trained). In other embodiments where the neural network 560 is made up of a set of connected CNNs, the neural network 760 may just be a single neural network (e.g., one of the connected set). This difference between the neural network 760 and neural network 560 may be due the fact that ensembling between different (potentially identical) neural networks of a set may not be necessary at the time of labeling a single training image taken from a single viewing angle.

Next, the neural network 760 outputs a classification 572 including a confidence score (0.82) in whether the defect 120 is detected in the cropped image. The classification 572 and whole training image 110-$i$ are input into the image labeler 790. Responsive to the confidence score being determined as above a first threshold level of confidence (e.g., 70% confidence), the image labeler 790 outputs a labeled training image 791 indicating that the defect 120 is present in the image 110-$i$. The labeled training image 791 may also include a bounding box describing the location of the defect 120 in the image 110-$i$.

In some embodiments, the labeled training image 791 may be most useful for training other neural networks to detect defects in panels when the image is included in a large set of labeled training images (e.g., one million) that are used together for such training. Some of these labeled training images may be of different panels (e.g., other LCD panels). Others of these labeled training images may be of the same panel 100 but captured at a different viewing angle, such that the defect is more visible in that image. Yet others of these labeled training images may be captured at such viewing angles that the defect is not detectable. For example, the labeled training image 792 may be generated from other images of panel 100, such as 110-N, wherein the defect 120 is not detected (or where the confidence score in the presence of the defect is below the first threshold or a different threshold), and, therefore, the image is labeled as indicating that the defect is not detected, and the location of the defect is not labeled on the image.

While embodiments herein reference LCD panels, it is contemplated that these embodiments may be equally applicable to other types of display panels (or even to other types of manufactured objects), and, as such, the term display panel should be construed more broadly than just limited to LCD panels.

As used herein, ordinal numbers (e.g., first, second, third) are merely used to identify corresponding items and are not intended to connote specific ordering or proximity of those items, in series or otherwise.

Some embodiments of the present disclosure may offer various technical computing advantages over other approaches. These computing advantages address problems arising in the realm of efficient, cost-effective training of neural networks, particularly as they relate to feature detection in situations where feature visibility varies under conditions of image capture.

Figure 8:
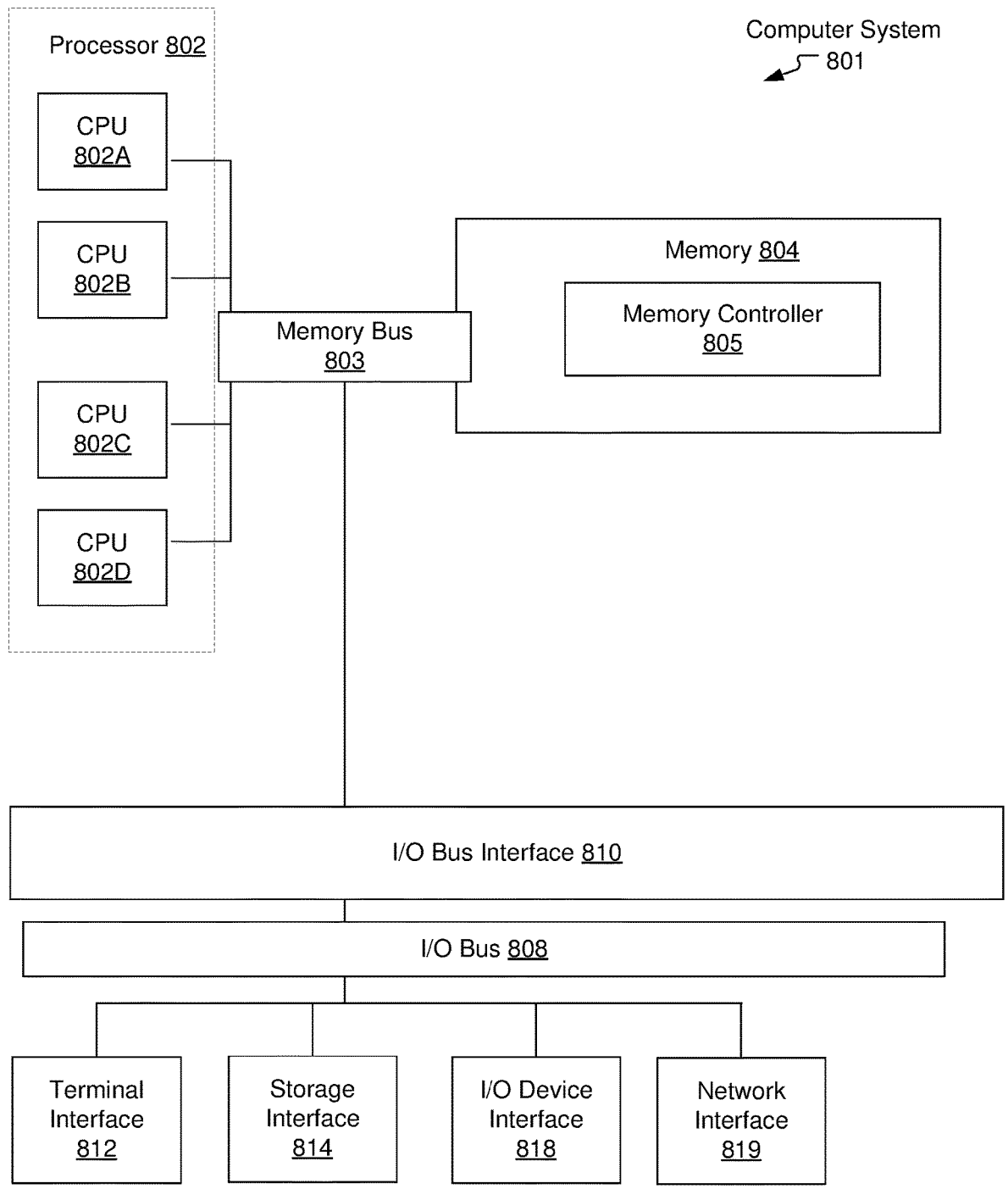
FIG. 8 illustrates a high-level block diagram of an example computer system that may be used in implementing embodiments of the present disclosure.

Referring now to FIG. 8, shown is a high-level block diagram of an example computer system (i.e., computer) 801 that may be used in implementing one or more of the methods or modules, and any related functions or operations, described herein (e.g., using one or more processor circuits or computer processors of the computer), in accordance with embodiments of the present disclosure. In some embodiments, the major components of the computer system 801 may comprise one or more CPUs 802, a memory subsystem 804, a terminal interface 812, a storage interface 814, an I/O (Input/Output) device interface 818, and a network interface 819, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the processer 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may comprise one or more levels of on-board cache.

In some embodiments, the memory subsystem 804 may comprise a random-access semiconductor memory, storage device, or storage medium (either volatile or non-volatile) for storing data and programs. In some embodiments, the memory subsystem 804 may represent the entire virtual memory of the computer system 801, and may also include the virtual memory of other computer systems coupled to the computer system 801 or connected via a network. The memory subsystem 804 may be conceptually a single monolithic entity, but, in some embodiments, the memory subsystem 804 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. In some embodiments, the main memory or memory subsystem 804 may contain elements for control and flow of memory used by the Processor 802. This may include a memory controller 805.

Although the memory bus 803 is shown in FIG. 8 as a single bus structure providing a direct communication path among the CPUs 802, the memory subsystem 804, and the I/O bus interface 810, the memory bus 803 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, mobile device, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

Further, as used herein, the term "set" means one or more.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method, comprising:
inputting, into a set of neural networks, a plurality of different images of a same region of interest in a same object, wherein a visual feature is present in the region and detectability of the feature within each image of the region varies depending on a value of a variable condition under which that image is captured, wherein each image of the region has been captured under a different value of the variable condition, wherein the variable condition comprises at least lighting across a spectrum and two camera spherical coordinate viewing angles from which the plurality of different images are captured;

generating, by the set of neural networks, a classification for each image, wherein each classification includes a confidence score in a prediction of whether the visual feature is present in the region;

ensembling the classification for each image to generate a final classification for the region;

computing, by applying a loss function, a loss based on comparing the final classification to a ground truth of whether the feature is present in the region; and adjusting parameters of the set of neural networks based on the computed loss.

2. The method of claim 1, further comprising:

receiving a first training image of a second object captured under a first value of the variable condition;

identifying, based on a predetermined location of the feature present in the second object, a first region of interest on the second object within the first training image;

cropping the first training image to obtain a first cropped image of the first region of interest;

inputting, into at least one neural network with the adjusted parameters, the first cropped image; and detecting, by the at least one neural network, a present feature in the first cropped image and responsively labeling the first training image to indicate the present feature therein.

3. The method of claim 2, further comprising:

receiving a second training image of the second object captured under a second value of the variable condition;

identifying, based on the predetermined location of the feature present in the second object, the first region of interest on the second object within the second training image;

cropping the second training image to obtain a second cropped image of the first region of interest;

inputting, into the at least one neural network with the adjusted parameters, the second cropped image; and failing to detect, by the at least one neural network, the present feature in the second cropped image and responsively labeling the second training image to indicate that the present feature is not detected therein.

4. The method of claim 3, wherein the labeled first training image and the labeled second training image are configured for use together in training other neural networks to detect whether the feature is present in other objects.

5. The method of claim 1, wherein the same object is a display panel, and wherein the feature is a physical defect in the display panel.

6. The method of claim 1, wherein each image of the plurality of different images of the region of interest is cropped from a corresponding image of a plurality of different images of the object as a whole.

7. The method of claim 1, wherein the method is used to train the set of neural networks to detect whether the visual feature is present in objects, wherein, when the feature is present in a given object, the detectability of the feature within images of that object varies depending on values of the variable condition under which the images of that object are captured.

8. A computer program product, comprising at least one computer readable storage medium that is not a transitory signal per se, the at least one computer readable storage medium having program instructions embodied therewith, the programs instructions configured, when executed by at least one computer, to cause the at least one computer to perform a method comprising:

inputting, into a set of neural networks, a plurality of different images of a same region of interest in a same object, wherein a visual feature is present in the region and detectability of the feature within each image of the region varies depending on a value of a variable condition under which that image is captured, wherein each image of the region has been captured under a different value of the variable condition, wherein the variable condition comprises at least lighting across a spectrum and two camera spherical coordinate viewing angles from which the plurality of different images are captured;

generating, by the set of neural networks, a classification for each image, wherein each classification includes a confidence score in a prediction of whether the visual feature is present in the region;

ensembling the classification for each image to generate a final classification for the region;

computing, by applying a loss function, a loss based on comparing the final classification to a ground truth of whether the feature is present in the region; and adjusting parameters of the set of neural networks based on the computed loss.

9. The computer program product of claim 8, wherein the method further comprises:

receiving a first training image of a second object captured under a first value of the variable condition;

identifying, based on a predetermined location of the feature present in the second object, a first region of interest on the second object within the first training image;

cropping the first training image to obtain a first cropped image of the first region of interest;

inputting, into at least one neural network with the adjusted parameters, the first cropped image; and detecting, by the at least one neural network, a present feature in the first cropped image and responsively labeling the first training image to indicate the present feature therein.

10. The computer program product of claim 9, wherein the method further comprises:

receiving a second training image of the second object captured under a second value of the variable condition;

identifying, based on the predetermined location of the feature present in the second object, the first region of interest on the second object within the second training image;

cropping the second training image to obtain a second cropped image of the first region of interest;

inputting, into the at least one neural network with the adjusted parameters, the second cropped image; and failing to detect, by the at least one neural network, the present feature in the second cropped image and responsively labeling the second training image to indicate that present feature is not detected therein.

11. The computer program product of claim 10, wherein the labeled first training image and the labeled second training image are configured for use together in training other neural networks to detect whether the feature is present in other objects.

12. The computer program product of claim 8, wherein the method is used to train the set of neural networks to detect whether the visual feature is present in objects, wherein, when the feature is present in a given object, the detectability of the feature within images of that object varies depending on values of the variable condition under which the images of that object are captured.

13. A system, comprising:
at least one computer readable storage medium; and
at least one processor in communication with the at least one computer readable storage medium, the at least one processor configured to obtain instructions from the at least one computer readable storage medium that cause the at least one processor to perform a method comprising:
inputting, into a set of neural networks, a plurality of different images of a same region of interest in a same object, wherein a visual feature is present in the region and detectability of the feature within each image of the region varies depending on a value of a variable condition under which that image is captured, wherein each image of the region has been captured under a different value of the variable condition, wherein the variable condition comprises at least lighting across a spectrum and two camera spherical coordinate viewing angles from which the plurality of different images are captured;
generating, by the set of neural networks, a classification for each image, wherein each classification includes a confidence score in a prediction of whether the visual feature is present in the region;
ensembling the classification for each image to generate a final classification for the region;
computing, by applying a loss function, a loss based on comparing the final classification to a ground truth of whether the feature is present in the region; and
adjusting parameters of the set of neural networks based on the computed loss.

14. The system of claim 13, wherein the method further comprises:
receiving a first training image of a second object captured under a first value of the variable condition;
identifying, based on a predetermined location of the feature present in the second object, a first region of interest on the second object within the first training image;
cropping the first training image to obtain a first cropped image of the first region of interest;
inputting, into at least one neural network with the adjusted parameters, the first cropped image; and
detecting, by the at least one neural network, a present feature in the first cropped image and responsively labeling the first training image to indicate the present feature therein.

15. The system of claim 14, wherein the method further comprises:
receiving a second training image of the second object captured under a second value of the variable condition;
identifying, based on the predetermined location of the feature present in the second object, the first region of interest on the second object within the second training image;
cropping the second training image to obtain a second cropped image of the first region of interest;
inputting, into the at least one neural network with the adjusted parameters, the second cropped image; and
failing to detect, by the at least one neural network, the present feature in the second cropped image and responsively labeling the second training image to indicate that present feature is not detected therein.

16. The system of claim 15, wherein the labeled first training image and the labeled second training image are configured for use together in training other neural networks to detect whether the feature is present in other objects.

17. The system of claim 13, wherein the method is used to train the set of neural networks to detect whether the visual feature is present in objects, wherein, when the feature is present in a given object, the detectability of the feature within images of that object varies depending on values of the variable condition under which the images of that object are captured.

18. The method of claim 1,
wherein the same object is a display panel, wherein the feature is a physical defect in the display panel, and wherein the variable condition further comprises camera angle from which the images of the display panel are captured, and
wherein the method is used to train the set of neural networks to detect whether the visual feature is present in objects, wherein, when the feature is present in a given object, the detectability of the feature within images of that object varies depending on values of the variable condition under which the images of that object are captured.

19. The computer program product of claim 8, wherein the same object is a display panel, and wherein the feature is a physical defect in the display panel.

20. The system of claim 13, wherein the same object is a display panel, and wherein the feature is a physical defect in the display panel.

* * * * *